INVENTOR.
CHARLES W. SMITH

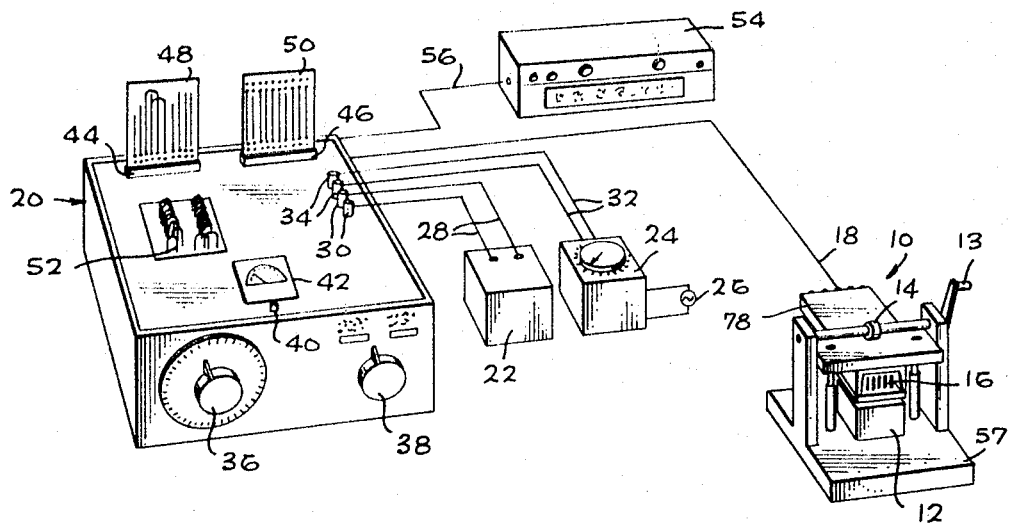
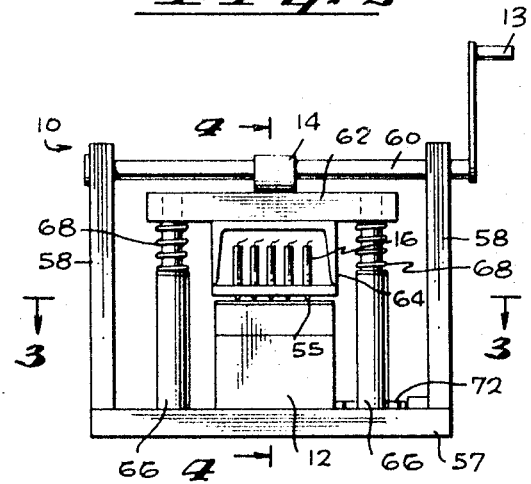
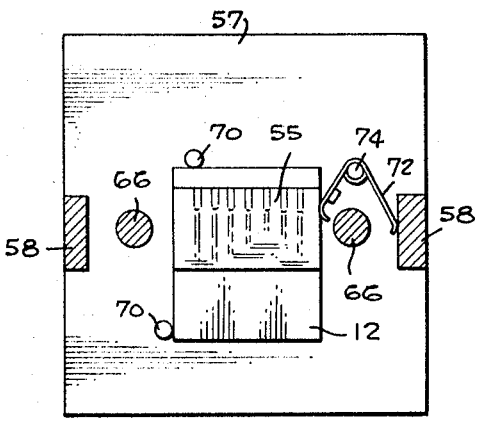
July 29, 1969
C. W. SMITH
3,458,807
TEST APPARATUS FOR DETERMINING RESISTANCE
AND OVERLOAD CAPABILITY OF THIN FILM
RESISTORS CARRIED ON A SUBSTRATE
Filed Nov. 14, 1966
2 Sheets-Sheet 1
Fig. 1
Fig. 2
Fig. 3
Fig. 4
CHARLES W. SMITH
INVENTOR.
BY
Roger A. Marrs July 29, 1969  C. W. SMITH  3,458,807
TEST APPARATUS FOR DETERMINING RESISTANCE
AND OVERLOAD CAPABILITY OF THIN FILM
RESISTORS CARRIED ON A SUBSTRATE
Filed Nov. 14, 1966  2 Sheets-Sheet 2

BY
Roger A. Marso.

United States Patent Office 3,458,807
Patented July 29, 1969

3,458,807
TEST APPARATUS FOR DETERMINING RESISTANCE AND OVERLOAD CAPABILITY OF THIN FILM RESISTORS CARRIED ON A SUBSTRATE
Charles W. Smith, Canoga Park, Calif., assignor to The Bunker-Ramo Corporation, Canoga Park, Calif., a corporation of Delaware
Filed Nov. 14, 1966, Ser. No. 599,337
Int. Cl. G01r 15/12
U.S. Cl. 324—73                                10 Claims

ABSTRACT OF THE DISCLOSURE

An apparatus for checking a matrix of thin film resistors carried on a substrate. A plurality of probes simultaneously contact the thin film resistors and electrically connect the resistors to a test unit. The test unit accepts a program card having thereon a set of test resistors of preselected values corresponding to the desired values of the thin film resistors. Appropriate circuitry compares the value of each thin film resistor with the value of the corresponding test resistor and indicates any discrepancy therebetween. Another program card provides appropriate series resistance whereby passing the same magnitude current through each thin film resistor and a corresponding series resistor subjects the thin film resistor to a preselected power overload condition.

---

The invention relates in general to testing and measurement devices and, in particular, to an apparatus device for checking electrical and mechanical characteristics of components such as for measuring the resistances and overload capabilities of a plurality of resistors formed on a thin film circuit board.

The rapid advancement of the art of micro-circuitry has occasioned the production of thin film resistors formed simultaneously on a supporting and insulating substrate. Such an array of thin film resistors, varying greatly in values, are formed generally by plating through a mask or by plating a solid film of a resistive material and then preferentially etching material away to leave the thin film resistor array. After such an array of thin film resistors have been formed, it is necessary to check the value of each resistor on the substrate to determine whether the resistor falls within permissive tolerance limits as far as value is concerned and as to whether the resistor is sufficiently well formed so as to withstand a prescribed overload without changing its resistor value.

As is well known, the resistance and overload testing of discrete resistors has been performed on an individual basis with one resistor at a time being checked to verify if the resistor falls within the permissive tolerance ranges and can withstand prescribed overload conditions. These techniques used to check out such discrete resistors have been carried forward for the most part into the checking of thin film resistor circuits. While the equipment necessary to check such thin film resistor circuits has been miniaturized to be compatible with the dimensions of these circuits, the prior art techniques of checking each resistor individually (as by means of a pair of probes and a microscope) have been carried forward. In general, a pair of probes are brought down on the thin film resistive circuit at the respective ends of a particular resistor and a preselected current is passed through the resistor so as to cause a voltage to appear on a voltmeter representative of the resistance of the thin film resistor. This value was then compared to the value desired to be obtained. After this was done, the individual resistor received a current overload to see whether it could withstand a prescribed overload pulse.

All these disadvantages of the prior art testing methods and devices are obviated by the present invention in which the thin film resistor circuit to be tested is placed in a test fixture having a plurality of test probes therein, pairs of which respectively bridge a respective one and preferably all of the resistors on the substrate simultaneously. A program card is provided which has thereon a plurality of adjustable resistors whose values are set to correspond to the desired resistance values of the thin film resistors to be checked. The program card is then inserted into circuitry which provides a one-to-one correspondence between the card resistors and the thin film resistors. The ratio of thin film resistor value to the sum of thin film and adjustable resistor value is then displayed sequentially for each of the thin film resistors. For overload tests, all of the thin film resistors are tested simultaneously and a program card is provided with a plurality of dropping resistors whose values are adjusted so that the proper current flows through each thin film resistor.

Therefore, it is a primary object of the present invention to provide a new and improved device for testing the electrical charatceristic of a plurality of thin film resistors arranged in a preselected geometrical array and to provide an apparatus for simultaneously subjecting the plurality of thin film resistors to a prescribed overload condition. Also, the present invention provides an improved test device which enables all of the resistors on a supporting substrate to be sequentially tested without test probe readjustment and which provides a test device that sequentially compares the value of each thin film resistor to the value of a reference resistor.

These and other objects of the present invention will become more apparent from the following detailed description along with the accompanying drawings. It is to be expressly understood, however, that the following description and the accompanying drawings are merely for purposes of illustration and are not intended as a limitation on the present invention. In addition, reference numerals have been carried forward throughout the drawings where applicable to designate like parts of the invention.

FIGURE 1 is a perspective view illustrating the basic components of the present invention.

FIG. 2 is a front view illustration of the test fixture shown in FIG. 1 employed to mount the electrical component laden substrate;

FIG. 3 is a cross-sectional view of the test fixture of FIG. 2 as taken in the direction of arrows 3—3 thereof;

FIG. 4 is a cross-sectional view of the test fixture as taken in the direction of arrows 4—4 of FIG. 2;

Figure 5:
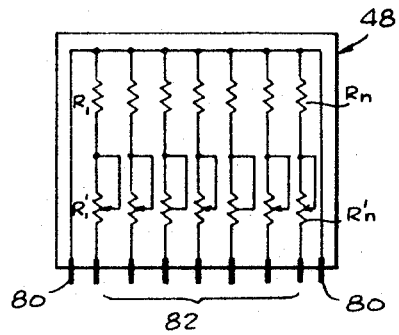
FIG. 5 illustrates a program card utilized to test the value of the thin film resistors carried by the substrate.

Referring to FIG. 1, the basic elements of the present invention are illustrated in a typical layout on a test bench or the like. A text fixture 10 is provided which has a block 12 upon which the substrate carrying the thin film resistors can be placed. An arm 13 rotates an eccentric cam 14 which presses a plurality of test points 16 against the matrix of thin film resistors. The test fixture 10 is coupled by means of line 18 to a control box 20 which houses the necessary control and interconnection circuitry. The line 18 comprises a plurality of wires each one connected to one of the test probes 16.

The control box 20 receives its sources of power from a DC voltage source 22, such as a battery, and a variable AC voltage source 24, commonly termed a variac, which in turn is connected to a source of AC power 26. As explained more fully hereinafter, the DC source 22 provides the necessary current for the measurement of the resistors while the AC voltage sources 24 and 26 provide the current necessary for the overload test. The DC voltage source 22 is connected by means of leads 28 to terminals 30 on the control box 20. The variable AC source 24 is connected by means of leads 32 to the terminals 34 on the control box 20.

Figure 6:
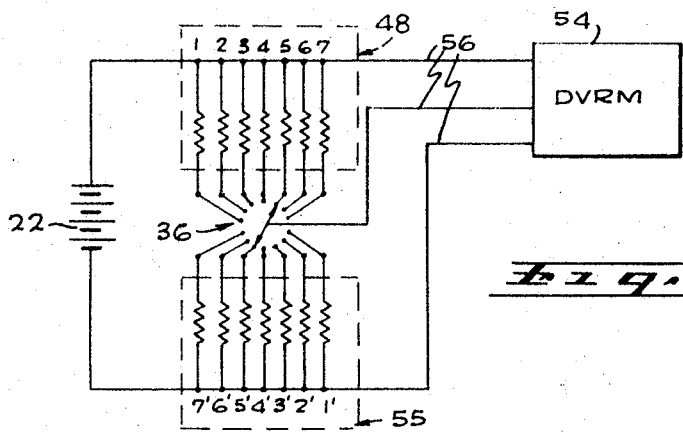
FIG. 6 is a diagrammatic illustration of the circuitry utilized for comparing the thin film resistor values to the test resistor values.

The control box 20 is provided with a switching circuit, more fully illustrated in FIG. 6, which is controlled by means of a switching knob 36 and is provided, in a preferred embodiment, with 48 positions. For illustrational simplicity, 48 positions are not shown. The control box 20 is also provided with a switch 38 which determines whether the apparatus is adapted to be operated in the measurement mode or in the overload mode. The overload mode of operation is actuated by a push button 40 and the overload current is measured by ammeter 42.

The control box 20 is provided with female receptacles 44 and 46 which receive the program cards 48 and 50 for resistor value and overload test, respectively. The control box 20 also has a patch board 52 located thereon which allows the resistors on the program card 48 to be selectively connected by means of the matrix of probes 16, to the individual thin film resistors. Finally, a digital voltmeter ratiometer 54 is provided to display the ratio of resistive values, as more fully explained hereinafter. The digital voltmeter ratiometer 54 is coupled to the control box 20 by means of lead 56.

As explained previously, the thin film resistor matrix is placed for testing in the test fixture 10. The exact construction of the test fixture 10 can be better explained with reference to FIGS. 2, 3, and 4. The thin film resistors are shown as mounted on a substrate 55 in turn mounted on mounting block 12. The mounting block 12 rests on the base 5 of the test fixture 10 and has uprights 58 which carry a rod 60 having thereon the eccentric cam 14 that is operated by handle 13.

When the handle 13 is turned, the eccentric cam 14 presses down against a member 62 to which is connected a block 64, inside of which is mounted the test probes 16. The member 62 and the block 64 are constrained to move in a vertical direction by several rods 66 connected to the base 56 of the test fixture 10. The rods 66 are provided with springs 68 which return the member 62 and the block 64 to their original position upon release of pressure by the cam 14. The thin film resistor substrate 55 is mounted in place by positioning pins 70 and held in that position by a spring 72 mounted on a pin 74 and arranged to press against the thin film resistor substrate 55 and the upright member 58. The individual test probes are electrically connected by leads 76 through terminal block 78. Thus, it is seen by means of the test fixture 10 that all of the test probes 16 are simultaneously placed into exact position upon the thin film resistive substrate 55 by the simple turn of the handle 13.

Referring now to FIG. 5, the program card 48 used to test the values of the thin film resistors is illustrated in greater detail. As explained previously, the decision as to whether the values of the thin film resistors on the substrate 55 are correct is made by comparing such resistors to resistors of fixed value equal to the desired resistance value. The fixed or test resistors are shown mounted on the program card 48 and comprise a series of fixed resistors R1 through RN and a series of variable resistors (commonly called trimming resistors) R1' through RN'. Since the resistors R1 through RN are selected from a class of resistors having generally a 1% tolerance, the trimming resistors R1' through RN' are serially connected so as to be able to adjust the value of the resistance $RN+RN'$ to the exact value desired. One end of each of the resistors is commonly connected to a male terminal 80 while the other ends of each of the resistors are individually connected to individual male terminals 82. The male terminals 80 and 82 insert into the female connector 46 on the control box 20.

Although not illustrated in detail, the program card 50 is constructed in a manner like program card 48 and comprises a plurality of 2 watt resistors whose values are selected, as explained more fully hereinafter, to provide the proper load across the thin film resistors during overload test.

In FIG. 6, a simplified circuit diagram of the resistance measurement mode of the present invention is illustrated. The program card 48, upon insertion into the female receptacle 46, has the common terminal 80 connected to one side of the battery 22 and to a first terminal of the digital voltmeter ratiometer 54. The terminals 82 are selectively coupled by means of the patch board 52 to the switching means 36. The switching means 36 is connected by means of lead 56 to a second terminal on the digital voltmeter ratiometer 54. In a like manner, the thin film resistor substrate 55 is connected by means of the lead 18 so that a common lead to all of the resistors on the thin film resistor substrate 55 is connected to the other side of the battery 22 and to a third terminal on the digital voltmeter ratiometer 54. The other end of the leads from the thin film resistors are connected to a set of terminals on the switching means 36.

As is shown in FIG. 6, the resistors on program card 48 are numbered 1–7 while the thin film resistors on substrate 55 are numbered 1' through 7'. In operation, the switching means 36 connects in sequence the test resistors 1–7 in series with the corresponding thin film resistors 1' through 7'. The digital voltmeter ratiometer 54 functions to measure the voltage drop across R1 plus R1' (which is equal to the voltage of battery 22) and compares this voltage drop with the voltage drop across R1' alone. If R1' is equal in value to R1, the digital voltmeter ratiometer 54, which presents as its output the ratio of the voltage drop across R1' to the voltage across R1 plus R1', will show .5 as its output. If, however, R1' is not equal to R1, then the digital voltmeter ratiometer 54 will display the figure .5 plus, to first order terms, the value $\Delta R/4R$ (where $\Delta R$ is the deviation from test value, the remainder term being minus $\Delta R^2/4R$). In a like manner, each of the test resistors 2–7 are sequentially connected in series to the thin film resistors 2' through 7' and the corresponding ratio displayed on the digital voltmeter ratiometer 54. Thus, by means of the program card 48 and the interconnection circuitry in the control box 20, the entire set of resistor value on a thin film substrate can be quickly checked to see if they fall within the tolerance limits without the necessity of measuring the value of the actual resistors.

It is easily appreciated, of course, that the switching may be done manually or automatically and that the visual output of the digital voltmeter ratiometer 54 may be connected to a threshold device which would automatically reject a substrate if the ratio value exceeded a predetermined variance.

Figure 7:
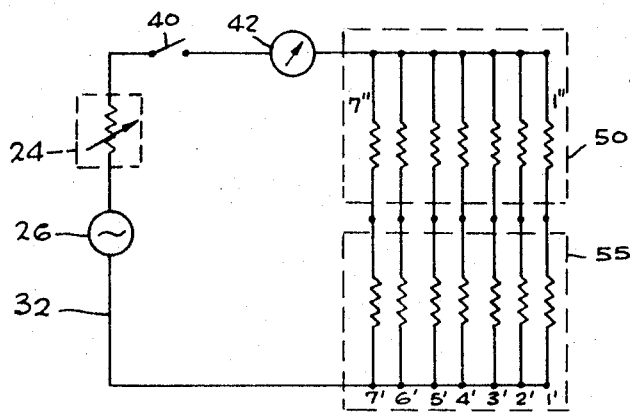
FIG. 7 is a schematic illustration of the circuitry employed to overload test the matrix of thin film resistors.

The overload test mode of operation of the present invention can best be explained with reference to FIG. 7. In FIG. 7, the dropping resistors 1" through 7" on program card 50 are shown connected in series with the thin film resistors 1' through 7' on the substrate 55. An overload current of sufficient magnitude to allow pulses at five times rated power to be sent through the thin film resistors 1' through 7' is provided by AC power source 26 and regulated by variac 24. The current is carried through lead 32 and is measured by ammeter 42. In one particular test, the overload consisted of two five second periods at five times rated power. The dropping resistors 1" through 7" are individually chosen so that while the same magnitude of current is passed through each series combination of the resistors 1' through 7' with 1" through 7", the individual thin film resistors 1' through 7' are caused to dissipate only five times their rated power, remaining power being dissipated in the resistors 1″ through 7″. In a particular embodiment, the resistors 1″ through 7″ were two watt resistors. By means of this arrangement, all of the thin film resistors 1′ through 7′ are tested simultaneously and then the resistance values thereof are individually checked by the circuitry in FIG. 6 to see if any of the resistor values now exceed the allowed resistor value variance.

The embodiments of the invention in which an exclusive property or privilege is claimed are defined as follows:

1. A device for testing a matrix array of thin film resistors arranged in a geometric pattern on the surface of a substrate, said device comprising:
   a base for supporting the substrate with said thin film resistors exposed;
   a plurality of probes;
   a carriage mounting said probes and adapted to move reciprocally so as to cause said probes simultaneously to make contact with said thin film resistors; and
   an electrical circuit network operably connected to said probes, said network comprising:
      a first program card carrying thereon a first array of test resistors having values corresponding to the desired values of said thin film resistors, means for sequentially coupling individual ones of said test resistors to the corresponding individual ones of said thin film resistors via said probes, and means for comparing the values of said coupled resistors; and
      a second program card carrying thereon a second array of test resistors, circuit means for simultaneously connecting each of said second array of test resistors in series with corresponding ones of said thin film resistors via said probes, the values of said second array of test resistors being selected so as to subject corresponding thin film resistors to the same preselected power overload condition for a test current of preselected magnitude, and means for providing said test current simultaneously in parallel to all of said series connected sets of resistors.

2. The device of claim 1 wherein said means for comparing includes means for providing a visual indication of the equality of said coupled resistors.

3. The device of claim 1 wherein said means for comparing includes means for determining the ratio of the value of said individual one of said thin film resistors to the sum of the values of said coupled resistors.

4. The device of claim 1 wherein said means for comparing includes means for visually displaying the ratio of the value of said individual one of said thin film resistors to the sum of the values of said coupled resistors.

5. The device of claim 4 wherein said displayed value is .5 when the values of said coupled resistors are equal.

6. The device of claim 1 wherein each of said first array of test resistors includes a resistor of fixed value series connected with a variable trimming resistor.

7. The device of claim 1 wherein each of said first array of test resistors is individually adjustable for obtaining the precise value desired.

8. The device of claim 1 wherein said means for sequentially coupling comprises a rotary switch.

9. The device of claim 1 wherein said means for sequentially coupling includes a patch board having a plurality of removable patch cords, each of said patch cords having opposite ends adapted to be plugged into said patch board to interconnect said individual ones of said test resistors to said corresponding individual ones of said thin films resistors.

10. The device of claim 9 wherein the pluggable arrangement of said patch cords is directly related to the geometrical pattern of said thin film resistors.

References Cited
UNITED STATES PATENTS

| | | | |
|---|---|---|---|
| 2,918,648 | 12/1959 | Ludman | 324—73 XR |
| 2,941,053 | 6/1960 | Braunstein | 324—73 XR |
| 3,065,414 | 11/1962 | Sears | 324—73 XR |
| 3,343,077 | 9/1967 | Brader | 324—73 XR |

RUDOLPH V. ROLINEC, Primary Examiner

E. L. STOLARUN, Assistant Examiner

U.S. Cl. X.R.

324—51, 62